W. N. DENNISON.
COMBINED SPEED REGULATOR AND BRAKE.
APPLICATION FILED AUG. 27, 1906.
927,504.
Patented July 13, 1909.
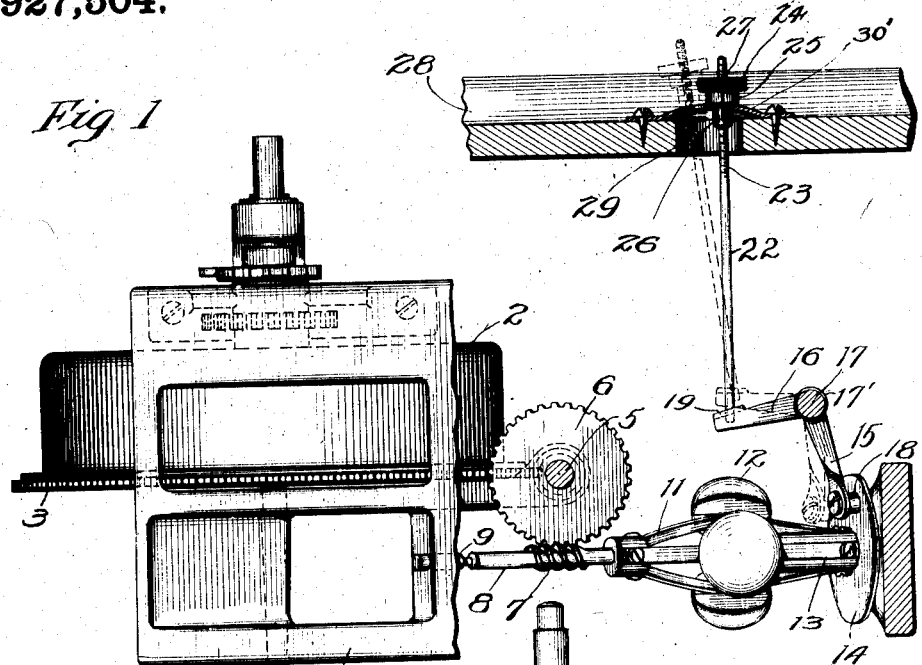
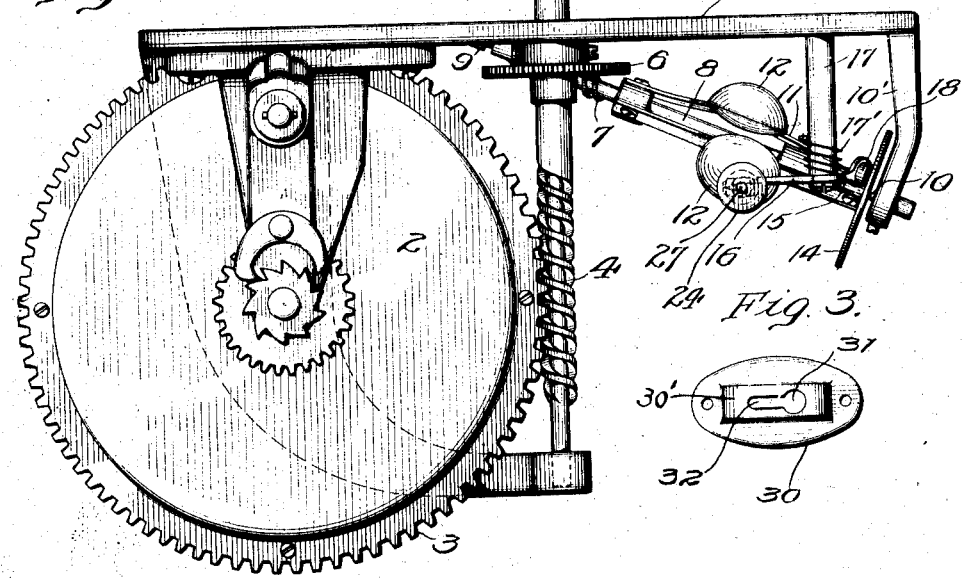
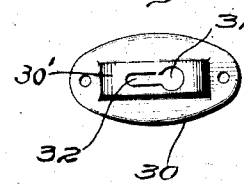
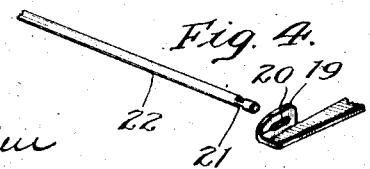
WITNESSES:
INVENTOR
Wilburn N Dennison
BY
ATTORNEY.

UNITED STATES PATENT OFFICE.

WILBURN N. DENNISON, OF MERCHANTVILLE, NEW JERSEY, ASSIGNOR TO VICTOR TALKING MACHINE COMPANY, A CORPORATION OF NEW JERSEY.

COMBINED SPEED REGULATOR AND BRAKE.

No. 927,504.

Specification of Letters Patent.

Patented July 13, 1909.

Application filed August 27, 1906. Serial No. 332,096.

*To all whom it may concern:*

Be it known that I, WILBURN N. DENNISON, a citizen of the United States, residing at the borough of Merchantville, in the county of Camden and State of New Jersey, have invented certain new and useful Improvements in a Combined Speed Regulator and Brake, of which the following is a full, clear, and complete disclosure, reference being had to the accompanying drawings, forming a part of this specification.

My invention relates to speed regulators and brakes, and particularly to that class of the same which are used to regulate the speeds of talking machines.

Talking machines are usually provided with speed regulators, and also with separate speed brakes which are used only in starting and stopping the machines, for while some of the speed regulators in use are capable of acting as a brake to start and to stop the machine, yet these regulators cannot be used for this purpose without changing the adjustment of the regulator which limits the rate of speed of the machine, and when so used it is necessary to readjust the regulator after starting the machine to obtain the desired speed.

The main objects of my invention are to provide a regulator of few parts and simple and inexpensive design and which will be durable and efficient in use; to provide a regulator which may be actuated quickly and conveniently to start or stop the machine and which may be quickly and easily adjusted to limit the speed of the machine to any predetermined rate; to provide a regulator which may be adjusted to limit the speed of the machine to any predetermined rate, and which may also be used as a brake to start and to stop the machine, without disturbing the adjustment which fixes the limit of the rate of speed; and to provide other improvements which will appear in the following specification and claims.

In the accompanying drawings Figure 1 is a top plan view of a talking machine motor having my invention applied thereto, the frame of the motor being broken away and the cabinet being shown in a fragmentary section; Fig. 2 is an elevation of the motor and frame detached from the cabinet; and Figs. 3 and 4 are views of parts of the regulator.

Referring to the drawings, the motor frame 1 has depending therefrom at one side, the motor 2 which drives a worm gear 3 meshing with the worm 4 on the turn table shaft 5, the upper end of which is adapted to receive the turn table of the talking machine.

The motor thus far described may be of any well known type and further description thereof is therefore not necessary.

On the turn table shaft 5 is mounted a worm gear 6 which meshes with a worm 7 on the inclined governor shaft 8, which latter is mounted to rotate in the end bearings 9 and 10. The bearing 9 is secured to the top plate of the frame and the bearing 10 to the lower end of the depending arm 10'. The governor is of the centrifugal type, the governor shaft 8 having the expansible arms 11 carrying the fly balls 12. The outer ends of the arms 11 are mounted upon a collar 13 to which is attached a friction disk 14, the said collar and disk being free to reciprocate on the shaft 8. The opposite ends of the arms 11 are secured to the governor shaft 8, as usual.

To regulate the speed of the governor a bell crank having arms 15 and 16, is mounted to swing on the lower end of a post 17, depending from the top plate of the frame of the motor and the outward movement of the arm 16 and the inward movement of the arm 15 are resisted by the pressure of the spiral spring 17' surrounding the post 17, one end of the spring being fastened to the latter and the other end to the bell crank lever. A friction pad 18, made of felt or any other suitable material, is mounted on the end of the arm 15, which is arranged to bring the pad into and out of engagement with the friction disk. The face of the said disk being transverse to the plane of the main portion of the arm 15, the end of the latter is twisted so as to bring the face of the friction pad substantially parallel to the face of the friction disk. The spring 17' not only normally resists the movement of the friction pad away from the disk but when permitted exerts a pressure of said pad upon the disk sufficient to stop the revolution of the governor. On the free end of the bell crank arm 16 is a laterally extending lug 19, which is split to form a slot 20 in which is loosely mounted the recess 21 of the actuated pin 22, the latter having its outer or free end screw threaded at 23 and carrying a thumb nut. The thumb nut has a milled head 24, whereby it may be conveniently rotated and a reduced shank 25 having a reduced inner end forming a lug 26. The said nut is split longitudinally at 27 and is expanded upon the pin 22, thus effecting a tight engagement with the screw threaded portion thereof. In the exterior wall 28 of one side of the cabinet is an orifice 29 over which fits a plate 30, struck up upon which is an arc of a circle having a radius. Substantially equal to the effective length of the pin 22, is a raised portion 30' having a circular aperture 31 therein, adapted to receive the lug 26 of the nut, but too small to receive the shank thereof. Extending laterally from the aperture 31 and communicating therewith is an elongated slot 32 adapted to receive the pin 22 but too small in diameter to receive the lug 26 of the nut.

The operation of the device is as follows: Assuming the regulator to be in the position indicated in full lines in the drawing, to start the motor the thumb nut is grasped by the milled head and drawn outwardly until the lug 26 of the nut is withdrawn from the aperture 31, when the nut is then swung laterally carrying the pin through the slot 32, and the nut is then released, whereupon the lug 26 of the nut will be held rigidly against the outer surface of the raised portion 30' of the plate 30, thus locking the pin and lever in the position shown in the dotted lines in Fig. 1. This movement of the nut releases the friction pad from engagement with the friction disk, and the motor, thus released, begins to revolve, the governor shaft carrying the friction disk and fly balls therewith, advancing the friction disk toward the friction pad in proportion to the increase of speed, as usual. When the disk reaches the friction pad 15, in its dotted line position, the disk is held by the pad against further advancement but continues to revolve subject to the resistance of the pad which limits the speed of the disk to a fixed rate.

A variation of the rate of speed of the governor may be accomplished by adjusting the effective length of the pin 22 by rotating the nut upon its threads to change the longitudinal position of the pin, whereby the friction pad will be moved toward or away from the friction disk, thus decreasing or increasing the speed of the disk accordingly. The adjustment of the nut longitudinally of the pin may be made to such an extent as to entirely stop the motor but ordinarily the stopping of the motor is accomplished by the quicker action of the pin and nut together, without rotating the nut, by swinging the nut laterally and permitting the inner reduced end of the shank of the nut to drop into locking engagement in the aperture 31, as hereinbefore described, and the nut is rotated only when it is desired to change the rate of speed of the governor.

With this construction in mind it is evident that I have provided an extremely simple device which may be adjusted to limit the speed of a talking machine to any predetermined rate by the movement of a single actuating element, and whereby the machine may be started or stopped by the action of the same element without changing the adjustment of that element with respect to the said rate of speed.

Although I have shown only one form in which this invention may be embodied it is obvious that many changes might be made in the construction herein set forth within the scope of the appended claims without departing from the spirit of this invention or sacrificing any of the advantages thereof.

Having thus described my invention, what I claim and desire to protect by Letters-Patent of the United States, is,—

1. In a governor, the combination with a rotatable friction disk, of a brake member to engage said disk, an actuating pin jointed to said member at one end, and means for adjusting the other end of said pin in various positions laterally and longitudinally to control the speed of said disk.

2. In a governor, the combination with a rotatable friction disk, of a brake member mounted to engage said disk, an actuating pin jointed to said member, a nut screw threaded upon said pin, and means for adjusting the nut in various positions laterally to control the speed of said disk.

3. In a governor, the combination with a rotatable friction disk, of a lever pivoted to engage said disk, an actuating pin pivoted to said lever, and means for adjusting said pin in various positions laterally and longitudinally to control the speed of said disk.

4. In a governor, the combination with a rotatable friction disk, of a lever pivoted to engage said disk, an actuating pin pivoted to said lever, a nut screw threaded upon said pin, and means for adjusting the nut in various positions laterally to control the speed of said disk.

5. In a governor, the combination with a rotatable friction disk, of a lever pivoted to engage said disk, an actuating pin jointed to said lever, a nut screw threaded upon said pin, the inner end of said nut being of smaller diameter than the outer end of said nut, and a plate provided with an aperture arranged and adapted to receive the smaller end of said nut and having a slot extending laterally from said aperture to receive said pin.

6. In a governor, the combination with a rotatable friction disk, of a lever pivoted to engage said disk, an actuating pin jointed to said lever, a nut screw threaded upon said pin, the inner end of said nut being of smaller diameter than the outer end of said nut, and a plate provided with an aperture arranged and adapted to receive the smaller end of said nut and having a slot extending laterally from said aperture to receive said pin, said plate having the portion thereof surrounding said aperture and slot arranged on an arc of a circle.

7. A combined speed regulator and brake, comprising a governor, an actuating lever arranged to retard or stop the same, a laterally movable pin for actuating said lever, and rigid locking means, said pin being arranged to swing laterally into engagement with said locking means.

8. The combination with a governor, and mechanism arranged to retard or stop the same, of longitudinally movable means connected to said mechanism for actuating the same, and locking means, the said actuating means being movable laterally into locking engagement with said locking means.

9. The combination with a governor, and mechanism arranged to vary the speed thereof, of a longitudinally movable pin connected to said mechanism for actuating the same, and locking means, said pin being mounted to swing laterally into locking engagement with said locking means.

10. The combination with a governor and a spring actuated lever to retard or stop the same, of a longitudinally movable pin jointed to said mechanism for actuating said lever and locking means, said pin being mounted to swing laterally into locking engagement with said means.

11. The combination with a governor and mechanism arranged to control the speed of and to retard or stop the same, of a laterally swinging and longitudinally movable pin for actuating said mechanism, the free end of said pin being screw threaded and carrying a thumb-nut, and means for engaging said nut when said pin is swung laterally.

12. In a combined speed regulator and brake, a governor, a spring actuated lever arranged to retard or stop the same, longitudinally movable means for actuating said lever and locking means, said actuating means being arranged to swing laterally to effect a locking engagement with said locking means.

13. A combined speed regulator and brake, comprising a governor, a rotatably adjustable part for regulating the speed of said governor, locking means and connections between said adjustable part and the governor, the said adjustable part being movable longitudinally to retard or stop the rotation of the governor and arranged to swing laterally into locking engagement with said locking means.

14. The combination with a governor and a spring controlled lever, arranged to vary the speed of and to retard and stop the same, of a longitudinally movable and laterally swinging pin, for operating said lever, the free end of said pin being screw-threaded and carrying a thumb-nut, and means for engaging said nut when the said pin is swung laterally.

15. In a talking machine, a frame having an aperture therein, a governor and mechanism for varying the speed of and to retard or stop said governor, in combination with means extending through the aperture in said frame for operating said mechanism, the said means being mounted to swing laterally into locking engagement with the exterior surface of said frame.

16. In a talking machine, a frame having an aperture therein, a governor and mechanism for varying the speed of and to retard or stop said governor, in combination with a longitudinally movable pin to operate said mechanism, having its free end screw threaded and carrying a thumb-nut, extending through the aperture in said frame, said pin being mounted to swing laterally to effect an engagement between said nut and the exterior of the frame.

17. In a talking machine, a frame having an aperture therein, a governor and mechanism for varying the speed of and to retard or stop said governor, in combination with a longitudinally movable and laterally swinging pin extending through the aperture in said frame and having its free end screw threaded and carrying a nut, a plate having an aperture therein to permit the longitudinal movement of said nut and a slot extending laterally from said aperture to engage said nut.

18. In a talking machine, a frame having an aperture therein, a governor and mechanism for varying the speed of and to retard or stop said governor, in combination with a longitudinally movable and laterally swinging pin extending through the aperture in said frame and having its free end screw threaded and carrying a nut, a plate having a portion thereof raised on an arc of a circle, the said portion having an aperture therein to permit the longitudinal movement of said nut and a slot extending laterally from said aperture to engage said nut.

19. The combination in a governor of a friction disk, a bell crank lever having a friction pad at one end thereof arranged to engage said disk, a longitudinally movable and laterally swinging pin pivotally connected to the other end thereof for actuating said lever and means for locking said pin.

20. The combination in a governor of a friction disk, a bell crank lever having a friction pad at one end thereof arranged to engage said disk, a longitudinally movable and laterally swinging pin pivotally connected to the other end thereof for actuating said lever, the free end of said pin being screw threaded and carrying a nut, and means for engaging said nut when the pin is swung laterally.

21. The combination with a governor, of a lever arranged to engage the same, said lever being provided with a slot, an actuating pin of fixed length secured in said slot, and means for securing said pin in various positions laterally and longitudinally to control the speed of said governor.

22. The combination with a governor having a friction disk, of a bell crank lever having a friction pad at one end, said lever being pivoted to press said pad against said disk, a rigid pin pivoted to the other end of said lever, and means for securing said pin in various positions laterally and longitudinally to control the speed of the governor.

23. The combination with a governor having a friction disk, of a bell crank lever having a friction pad at one end, said lever being pivoted to press said pad against said disk, a pin pivoted to the other end of said lever, an apertured fixed plate, and a nut upon said pin engaging in said plate to secure said pin in various positions laterally to control the speed of the governor.

24. The combination with a governor having a friction disk, of a spring actuated bell crank lever having a friction pad at one end, said lever being pivoted to press said pad against said disk, a pin pivoted to the other end of said lever, an apertured fixed plate, and a nut upon said pin engaging in said plate to secure said pin in various positions laterally to control the speed of the governor.

25. In a governor, the combination with a rotatable member, of a lever pivoted to engage against said member, a rigid actuating pin jointed to said lever, and means for adjusting said pin in various positions laterally to control the speed of said rotatable member.

26. In a governor, the combination with a rotatable member, of a member pivoted to engage against said member, an actuating pin of fixed length jointed to said member, and means for adjusting said pin in various positions laterally to control the speed of said rotatable member.

27. In a governor, the combination with a rotatable member, of means pivoted to engage against said member, actuating means jointed to said first mentioned means, and means for adjusting said actuating means in various positions laterally to control the speed of said rotatable member.

28. In a governor, the combination with a rotatable member, of a brake member pivoted to engage said rotatable member, an actuating member jointed to said brake member, and means to adjust said actuating member in various positions laterally to control the speed of said rotatable member.

29. In a governor, the combination with a rotatable member, of a brake member arranged to engage said rotatable member, rigid actuating means jointed to said brake member, and means for adjusting said actuating means in various positions laterally to control the speed of said rotatable member.

30. In a governor, the combination with a rotatable member, and friction means engaging said member, of actuating means connected to said friction means to move longitudinally and laterally to stop and start the governor and means to vary the effective length of said actuating means to vary the speed of the governor.

31. In a governor the combination with a friction disk and a friction means engaging said disk, of a pin connected to said friction means to move longitudinally and laterally to stop and start the governor and means to vary the effective length of said pin to vary the speed of said governor.

32. In a governor, the combination with a movable member, of a brake member mounted to engage said movable member, means connected to said brake member for actuating the same, and means carried by said actuating means and adjustable with respect thereto for controlling the speed of said movable member.

33. In a governor the combination with a rotatable member, of a brake member mounted to engage said rotatable member, a pin connected to said brake member for actuating the same, and means mounted on said pin and adjustable longitudinally thereof to control the speed of said rotatable member.

34. In a governor the combination with a rotatable member, of a brake member mounted to engage said rotatable member, a pin connected to said brake member for actuating the same, and a nut threaded upon said pin to control the speed of said rotatable member.

35. In a governor, the combination with a rotatable friction disk, of a brake member mounted to engage said disk, an actuating member connected to said brake member, and means for adjusting said actuating member in various positions laterally and longitudinally to control the speed of said disk.

36. In a governor, the combination with a rotatable friction disk, of a brake member mounted to engage said disk, an actuating member connected to said brake member and carried thereby, a nut screw threaded upon said actuating member and means for adjusting said nut in various positions laterally and longitudinally to control the speed of said disk.

37. In a governor, the combination with a movable member, of a brake member mounted to engage said movable member, an actuating member for said brake member connected thereto and moving in unison therewith, and means for adjusting said actuating member in various positions laterally and longitudinally to control the speed of the said movable member.

38. In a governor, the combination with a movable member, of a brake member mounted to engage said movable member, means connected to said brake member for actuating the same, and means carried by said actuating member and adjustable with respect thereto for controlling the speed of said movable member, said actuating member and said adjustable means carried thereby being movable in unison to start or stop the movable member.

In witness whereof I have hereunto set my hand this 24th day of August, A. D. 1906.

WILBURN N. DENNISON.

Witnesses:
HARRY COBB KENNEDY,
ALEXANDER PARK.